(12) United States Patent
Tang et al.

(10) Patent No.: US 12,109,575 B2
(45) Date of Patent: Oct. 8, 2024

(54) ACCURATE FLOW CONTROL APPARATUS AND METHOD FOR CENTRIFUGAL SUPERGRAVITY ENVIRONMENT

(71) Applicant: ZHEJIANG UNIVERSITY, Zhejiang (CN)

(72) Inventors: Yao Tang, Hangzhou (CN); Chen Chen, Hangzhou (CN); Bo Huang, Hangzhou (CN); Daosheng Ling, Hangzhou (CN); Yunmin Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/493,790

(22) Filed: Oct. 24, 2023

(65) Prior Publication Data
US 2024/0058826 A1    Feb. 22, 2024

Related U.S. Application Data

(63) Continuation of application No. PCT/CN2022/114881, filed on Aug. 25, 2022.

(30) Foreign Application Priority Data

Sep. 14, 2021    (CN) .......................... 202111073380.8

(51) Int. Cl.
*B04B 13/00*    (2006.01)
(52) U.S. Cl.
CPC .................................... *B04B 13/00* (2013.01)
(58) Field of Classification Search
CPC ...................................................... B04B 13/00
See application file for complete search history.

(56) References Cited

FOREIGN PATENT DOCUMENTS

| CN | 103091372 | A | 5/2013 |
|---|---|---|---|
| CN | 203342956 | U | 12/2013 |
| CN | 103676982 | A | 3/2014 |
| CN | 108490151 | A | 9/2018 |
| CN | 109225681 | A | 1/2019 |
| CN | 110954172 | A | 4/2020 |

(Continued)

OTHER PUBLICATIONS

Notice of Allowance(CN202111073380.8); Date of Mailing: May 17, 2022.

(Continued)

*Primary Examiner* — Walter D. Griffin
*Assistant Examiner* — Shuyi S. Liu
(74) *Attorney, Agent, or Firm* — W&G Law Group

(57) ABSTRACT

An apparatus and a method for accurate flow control in a centrifugal supergravity environment. The apparatus comprises a control center, an oil supply module, a sensor module, an execution module and a centrifugal machine; the control center and the oil supply module are deployed in a normal gravity environment, and the sensor module and the execution module are deployed in a supergravity environment. According to the present application, the liquid level information of a model box, the piston position information of a servo actuator and the water supply flow information of the model box are collected by a sensor, and the information data are processed; control of the servo actuator is achieved by controlling an oil distributor; the flow fluctuation of a reciprocating water pump is weakened by the active complementation of flows of dual pump sets.

9 Claims, 7 Drawing Sheets

(56) References Cited

FOREIGN PATENT DOCUMENTS

| CN | 111426353 | A | 7/2020 |
| CN | 112067325 | A | 12/2020 |
| CN | 113049773 | A | 6/2021 |
| CN | 113909005 | A | 1/2022 |
| EP | 2366457 | A1 | 9/2011 |
| JP | 2005265726 | A | 9/2005 |

OTHER PUBLICATIONS

International Search Report (PCT/CN2022/114881); Date of Mailing: Oct. 17, 2022.
Temperature-control-test-of-scaled-model-of-high-capacity-hypergravity-centrifuge.
Measurement-and-characterization-of-elastic-wave-velocity-of-soil-in-hypergravity-centrifuge-model-test.
Non-inertial-effects-on-matter-motion-in-centrifugal-model-tests.
Research-on-Several-Crucial-Problems-of-Geotechnical-Centrifuge-Modeling-Techniques.

ACCURATE FLOW CONTROL APPARATUS AND METHOD FOR CENTRIFUGAL SUPERGRAVITY ENVIRONMENT

TECHNICAL FIELD

The present application relates to an apparatus and a method for accurate flow control in a centrifugal supergravity environment. The present application is high-end equipment, and thus can be used for studying the large-time and spatial evolution of rock and soil bodies such as a dam, and provides stable test conditions and reliable engineering guidance for reproducing the evolution and catastrophe of the hectometer-level rock and soil bodies by means of time-shrinking and scale-shrinking effects.

BACKGROUND

The supergravity environment provided by a centrifugal machine can reduce the effective stress field of a prototype on a scale model, which can achieve the purpose of scale reduction. Further superimposing a supergravity field and a seepage field and accelerating the flow process of the interphase fluid can achieve the effects of both scale reduction and time reduction. This technology provides conditions for reappearing the evolution process of hydraulic structure failure and exploring its mechanism. In particular, China is a country rich in hydraulic resources, and at present it is in the stage of vigorous development and utilization. As the main hydraulic structure, the reservoir dam is an important infrastructure, therefore the experimental study on the failure mechanism of this kind of hydraulic structure is particularly important. It is often necessary to realize the large-scale, rapid, accurate and dynamic rise and fall of the water level in these experiments. However, it is very difficult to provide large-flow continuous water flow for the model since the centrifugal machine is running at a high speed during the experiment. Therefore, it is a key technical difficulty to realize large-scale dynamic and accurate liquid level regulation under centrifugal supergravity, which is directly related to the success or failure of the experiment.

SUMMARY

In view of the shortcomings of the prior art, the object of the present application is to provide an apparatus and a method for accurate flow control in a centrifugal supergravity environment.

In order to achieve the above object, the present application provides the following technical solutions.

In one aspect, the present application discloses an apparatus for accurate flow control in a centrifugal supergravity environment. The apparatus includes a control center, an oil supply module, a sensor module, an execution module and a centrifugal machine; the control center and the oil supply module are deployed in a normal gravity environment, and the sensor module and the execution module are deployed in a supergravity environment;

the oil supply module includes an oil source, an oil distributor and an oil distributor servo valve; the oil source is connected with the oil distributor by an oil supply pipeline; the oil distributor is installed at a proximal end of a rotary arm of the centrifugal machine, and the other end of the oil distributor is connected with a servo actuator by an oil supply pipeline for supplying oil to the servo actuator; the oil distributor servo valve is installed on the oil distributor and used for controlling an output flow of the oil distributor;

the execution module includes a base, and two reciprocating water pump sets, support components and a model box fixed on the base; each reciprocating water pump set consists of the servo actuator and a reciprocating water pump connected in series; the base is fixed on a bottom plate of a centrifugal machine basket by screws; the servo actuator is configured for controlling the work of the reciprocating water pump; the reciprocating water pump is provided with a matched water distribution valve block and is communicated with the model box by a water inlet pipe and a water outlet pipe; the support components are respectively positioned at ends of the reciprocating water pump and the servo actuator to fix the reciprocating water pump and the servo actuator, and provide support for a cantilever structure of the reciprocating water pump, so as to avoid the cantilever structure from being forced to bend under the supergravity environment; a base of the model box is fixed in the center of the bottom plate of the centrifugal machine basket by screws, and the two reciprocating water pump sets are symmetrically arranged on two sides of the model box, so that the self-weight of the apparatus is evenly distributed on the bottom plate of the centrifugal machine basket; an internal structure of the model box includes an upper water storage tank, a model area, a lower water storage tank, a water inlet and a water outlet, and the reciprocating water pump is connected with the water inlet of the model box by a water inlet pipe and the water outlet of the model box by a water outlet pipe;

the sensor module includes a liquid level sensor, a displacement sensor and a flow sensor, which are respectively configured for collecting liquid level information of the model box, piston position information of the servo actuator and water supply flow information of the model box; the liquid level sensor is arranged in the upper water storage tank of the model box and measures and feeds back a liquid level height; the displacement sensor is installed on a piston rod of the servo actuator and measures and feeds back a piston position of the servo actuator; the flow sensor is installed on a water inlet pipeline of the model box and measures and feeds back a water supply flow of the model box; the liquid level sensor, the displacement sensor and the flow sensor are all used in the supergravity environment, and are all connected with a remote controller to feed back signals to the remote controller;

the control center includes a servo controller, the remote controller and a servo actuator control unit, and is configured for processing data of all sensors, controlling the servo actuator by controlling the oil distributor, and then controlling the reciprocating water pump by the servo actuator to control the water supply flow, thereby achieving a goal of accurate liquid level control;

the servo controller is installed at a proximal end of the rotary arm of the centrifugal machine and connected with the oil distributor servo valve, controls the oil distributor servo valve according to flow and liquid level requirements, and achieves control of the servo actuator by controlling the oil distributor by the oil distributor servo valve, so as to control the reciprocating water pump to complete water absorption or drainage at a certain speed and stroke;

the remote controller is installed on an instrument bin of the centrifugal machine, connected with the servo controller for controlling the servo actuator, and connected with the sensor to collect sensor information and feed the sensor information back to the servo actuator control unit;

the servo actuator control unit is installed at a user terminal outside the centrifugal machine, and is configured for generating control signals, forwarding the control signals to the servo controller by the remote controller, and outputting the control signals to the servo actuator to complete a closed-loop control of water supply flow and liquid level.

In another aspect, the present application discloses a method for accurate flow control in a centrifugal supergravity environment, in which flow fluctuation of the reciprocating water pump is weakened by active complementation of flows of dual pump sets; the method includes the following steps:

step 1, setting initialization parameters and basic parameters: setting control modes as speed control and closed-loop control; wherein a response of a control signal output is as follows: a flow control accuracy of 0.05 L/s corresponds to a piston speed of the servo actuator of 10 mm/s or 600 mm/min;

step 2, equipment transfer and installation: installing the sensor module and the execution module on the centrifugal machine, and checking whether the oil supply module leaks oil and a power supply state of a power supply system of the centrifugal machine;

step 3, checking before starting: checking a motion state of the servo actuator and working states of the flow sensor, the liquid level sensor and the displacement sensor under normal gravity, and debugging the sensors until the states are stable;

step 4, no-load operation: testing the following contents under conditions of centrifugal accelerations of 1 g, 10 g, 30 g, 60 g, 100 g and 150 g and oil source pressures of 3.5 MPa, 7.2 MPa, 13.5 MPa and 20.9 MPa, respectively: sensor working state test: working states of the flow sensor, the liquid level sensor and the displacement sensor under supergravity; servo actuator performance test: low-speed crawling performance parameters of a hydraulic cylinder and low-speed closed-loop control performance parameters under different g values;

step 5, accurate flow control of the execution module: naming two reciprocating water pumps as a target water pump and a control water pump respectively, and abruptly changing flows of the two reciprocating water pumps into a controllable flow fluctuation $\Delta Q$ in a time $\Delta t$ by precisely controlling a displacement of the servo actuator, with a flow fluctuation phase difference of 180°; inputting control signals as shown in formulas (1) and (2) in the servo actuator control unit to control the oil distributor servo valve, so as to control the water supply flow of the reciprocating water pumps, wherein the flow of the target water pump is $Q_1$, the flow rate of the control water pump is $Q_2$, T is a cycle of water supply, $\Delta t$ is the time of abrupt change of the flows, $Q_0$ is a final flow that is stably output, $\Delta Q$ is a flow fluctuation caused by pulsation, and t indicates a certain moment;

$$Q_1 = \begin{cases} \frac{2\Delta Q}{\Delta t} \times t + \frac{Q_0}{2} - \Delta Q & t \in \left[0, \frac{\Delta t}{2}\right) \\ \frac{Q_0}{2} & t \in \left[\frac{\Delta t}{2}, \frac{T}{2} - \frac{\Delta t}{2}\right) \\ -\frac{2\Delta Q}{\Delta t} \times t + \frac{Q_0}{2} - \Delta Q + \frac{\Delta Q}{\Delta t} \times T & t \in \left[\frac{T}{2} - \frac{\Delta t}{2}, \frac{T}{2}\right) \end{cases} \quad (1)$$

$$Q_2 = \begin{cases} \frac{Q_0}{2} & t \in \left[0, \frac{T}{4} - \frac{\Delta t}{2}\right) \\ -\frac{2\Delta Q}{\Delta t} \times t + \frac{Q_0}{2} - \Delta Q + \frac{\Delta Q}{2\Delta t} \times T & t \in \left[\frac{T}{4} - \frac{\Delta t}{2}, \frac{T}{4}\right) \\ \frac{2\Delta Q}{\Delta t} \times t + \frac{Q_0}{2} - \Delta Q - \frac{\Delta Q}{2\Delta t} \times T & t \in \left[\frac{T}{4}, \frac{T}{4} + \frac{\Delta t}{2}\right) \\ \frac{Q_0}{2} & t \in \left[\frac{T}{4} + \frac{\Delta t}{2}, \frac{T}{2}\right) \end{cases} \quad (2)$$

step 6, actively controlling the two reciprocating water pumps to generate equal and reverse flow fluctuations, wherein a phase difference of the reverse flow fluctuations is 180° and 90° from the phase difference of the flow fluctuations in step 5; as shown in equations (3) and (4), the flows of the target water pump and the control water pump after the equal and reverse flow fluctuations are as follows:

$$Q_1 = \begin{cases} \frac{2\Delta Q}{\Delta t} \times t + \frac{Q_0}{2} - \Delta Q & t \in \left[0, \frac{\Delta t}{2}\right) \\ \frac{Q_0}{2} & t \in \left[\frac{\Delta t}{2}, \frac{T}{4} - \frac{\Delta t}{2}\right) \\ \frac{2\Delta Q}{\Delta t} \times t + \frac{Q_0}{2} + \Delta Q - \frac{\Delta Q}{2\Delta t} \times T & t \in \left[\frac{T}{4} - \frac{\Delta t}{2}, \frac{T}{4}\right) \\ -\frac{2\Delta Q}{\Delta t} \times t + \frac{Q_0}{2} + \Delta Q + \frac{\Delta Q}{2\Delta t} \times T & t \in \left[\frac{T}{4}, \frac{T}{4} + \frac{\Delta t}{2}\right) \\ \frac{Q_0}{2} & t \in \left[\frac{T}{4} + \frac{\Delta t}{2}, \frac{T}{2} - \frac{\Delta t}{2}\right) \\ -\frac{2\Delta Q}{\Delta t} \times t + \frac{Q_0}{2} - \Delta Q + \frac{\Delta Q}{\Delta t} \times T & t \in \left[\frac{T}{2} - \frac{\Delta t}{2}, \frac{T}{2}\right) \end{cases} \quad (3)$$

$$Q_2 = \begin{cases} -\frac{2\Delta Q}{\Delta t} \times t + \frac{Q_0}{2} + \Delta Q & t \in \left[0, \frac{\Delta t}{2}\right) \\ \frac{Q_0}{2} & t \in \left[\frac{\Delta t}{2}, \frac{T}{4} - \frac{\Delta t}{2}\right) \\ -\frac{2\Delta Q}{\Delta t} \times t + \frac{Q_0}{2} - \Delta Q + \frac{\Delta Q}{2\Delta t} \times T & t \in \left[\frac{T}{4} - \frac{\Delta t}{2}, \frac{T}{4}\right) \\ \frac{2\Delta Q}{\Delta t} \times t + \frac{Q_0}{2} - \Delta Q - \frac{\Delta Q}{2\Delta t} \times T & t \in \left[\frac{T}{4}, \frac{T}{4} + \frac{\Delta t}{2}\right) \\ \frac{Q_0}{2} & t \in \left[\frac{T}{4} + \frac{\Delta t}{2}, \frac{T}{2} - \frac{\Delta t}{2}\right) \\ \frac{2\Delta Q}{\Delta t} \times t + \frac{Q_0}{2} + \Delta Q - \frac{\Delta Q}{\Delta t} \times T & t \in \left[\frac{T}{2} - \frac{\Delta t}{2}, \frac{T}{2}\right) \end{cases} \quad (4)$$

step 7, allowing the control water pump to actively delay by a phase difference of 90°, and combining and outputting the water supply flows of the control water pump and the target water pump to obtain the final flow $Q_0$ that is stably output; complementing a negative flow fluctuation, generated when a motion direction of the reciprocating water pump is changed, with a positive flow fluctuation that is actively controlled, and finally outputting a stable water supply flow, thus ensuring the feasibility of accurate flow control;

step 8, test of the whole water supply performance of the reciprocate pump sets: testing water supply flow, water supply efficiency, and continuous operations under the control of different amplitude-frequency parameters; and step 9, stopping running and disassembling the machine, and analyzing and processing data.

Further, the flow sensor is a customized electromagnetic flowmeter with a measuring range of 1.3 L/s and a resolution of 0.005 L/s.

Further, the displacement sensor is a customized LVDT displacement sensor with a measuring range of ±75 mm and a resolution of 0.005 mm.

Further, the liquid level sensor is a floating ball level gauge measuring sensor with a measuring range of ±250 mm.

Further, the water inlet pipes of the two reciprocating water pumps are communicated with the water inlet of the model box by a tee joint, and the water outlet pipes of the two reciprocating water pumps are communicated with the water outlet of the model box by a tee joint.

Further, the centrifugal machine has an acceleration range of 1 g-150 g, a maximum load of 4 t, and a centrifugal machine capacity of 400 g·t.

Further, the oil distributor has an output quantity of 4, a rated working pressure of 21 MPa, and a control voltage of DC24V.

Further, the servo actuator has a stroke of 200 mm.

Further, the upper water storage tank of the model box has a volume of 0.02 $m^3$, and the lower water storage tank of the model box has a volume of 0.32 $m^3$.

The present application has the following advantages: according to the present application, the liquid level information of a model box, the piston position information of a servo actuator and the water supply flow information of the model box are collected by a sensor, and the information data are processed; control of the servo actuator is achieved by controlling an oil distributor; the flow fluctuation of a reciprocating water pump is weakened by the active complementation of flows of dual pump sets, thereby providing large-flow continuous water flow under centrifugal supergravity, and achieving the purpose of dynamical and accurate control of the liquid level in a large range; the large-time and spatial evolution of rock and soil bodies such as dams can be studied, and stable test conditions can be provided for reappearing the evolution and catastrophe of hectometer-level rock and soil bodies; engineering guidance can be provided for the evolution and catastrophe of hectometer-level rock and soil bodies by time-shrinking and scale-shrinking effects.

Reference signs: 1—Centrifugal machine basket, 2—Instrument bin, 3—Oil distributor, 4—Proximal end of rotary arm of centrifugal machine, 5—Oil source, 6—Servo actuator, 7—Hydraulic cylinder, 8—Water distribution valve block, 9—Base, 10—Support component, 11—Check valve, 12—Water inlet pipe, 13—Water inlet, 14—Water outlet, 15—Water outlet pipe, 16—Model box water inlet, 17—Upper water storage box, 18—Dam model, 19—Lower water storage box, 20—Model box water outlet, 21—reciprocating water pump, 22—cantilever structure.

DESCRIPTION OF EMBODIMENTS

In order to make the object, technical solution and advantages of the embodiments of the present application more apparent, the technical solution in the embodiments of the present application will be described clearly and completely with reference to the drawings. Obviously, the described embodiments are part of the embodiments of the present application, but not all of the embodiments. Based on the embodiments in the present application, all other embodiments obtained by those skilled in the art without creative work shall fall into the protection scope of the present application.

The supergravity environment provided by a centrifugal machine can reduce the effective stress field of a prototype on a scale model, which can achieve the purpose of scale reduction. Further superimposing a supergravity field and a seepage field and accelerating the flow process of the interphase fluid can achieve the effects of both scale reduction and time reduction. This technology provides conditions for reappearing the evolution process of hydraulic structure failure and exploring its mechanism. Nevertheless, it is often necessary to realize the large-scale, rapid, accurate and dynamic rise and fall of the water level in these experiments. However, it is very difficult to provide large-flow continuous water flow for the model since the centrifugal machine is running at a high speed during the experiment. Therefore, it is a key technical difficulty to realize large-scale dynamic and accurate liquid level regulation under centrifugal supergravity, which is directly related to the success or failure of the experiments. This embodiment, which can better realize accurate flow control, will be described in detail with reference to the drawings.

Figure 1:
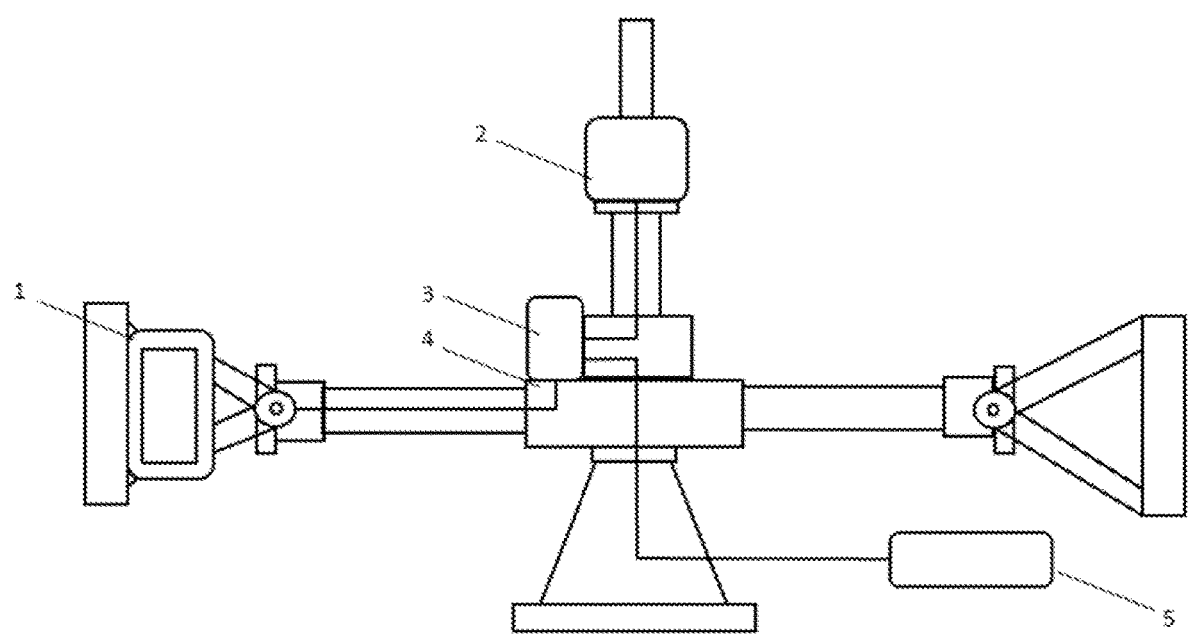
FIG. 1 is a schematic diagram of a centrifugal machine.
Figure 2:
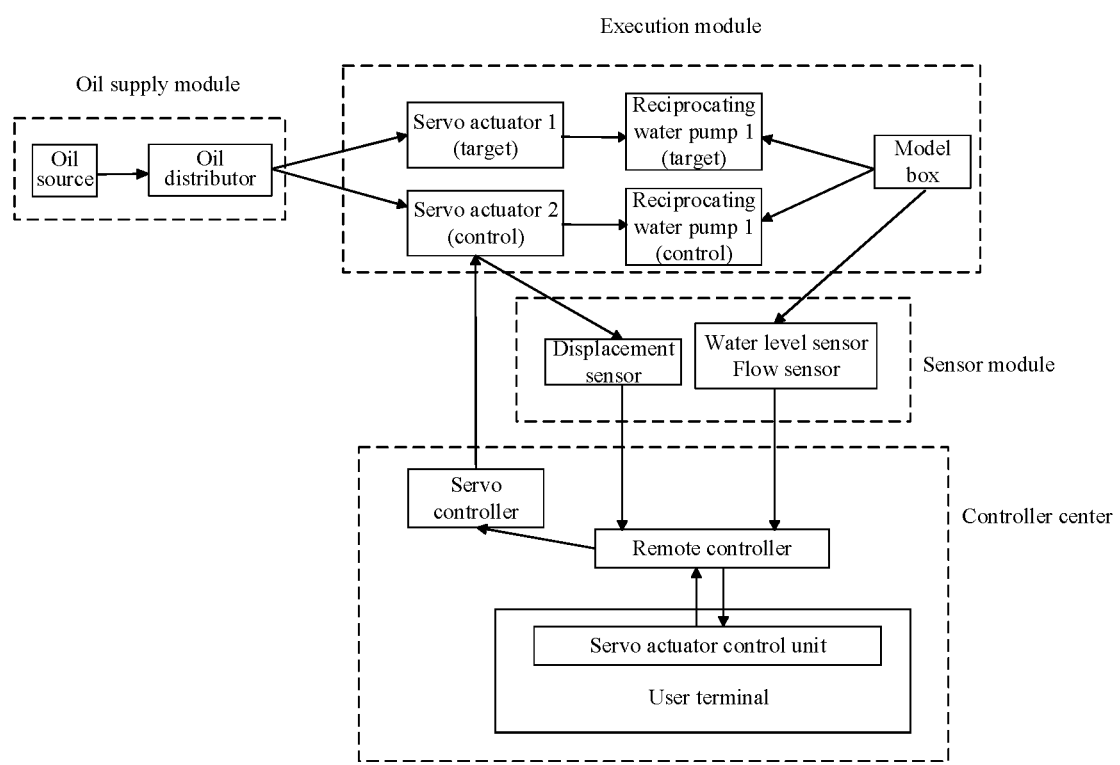
FIG. 2 is a working principle diagram of the present application.

FIG. 1 is a schematic diagram of a centrifugal machine, and FIG. 2 is a working schematic diagram of the present application. In this application, the liquid level information of a model box, the piston position information of a servo actuator 6 and the water supply flow information of the model box are collected by sensors, and the information data are processed, so that the control of the servo actuator 6 is realized by controlling the oil distributor 3, and the flow fluctuation of a reciprocating water pump is weakened by the active flow complementation of two pump group sets, thereby finally realizing the accurate flow control.

Figure 3:
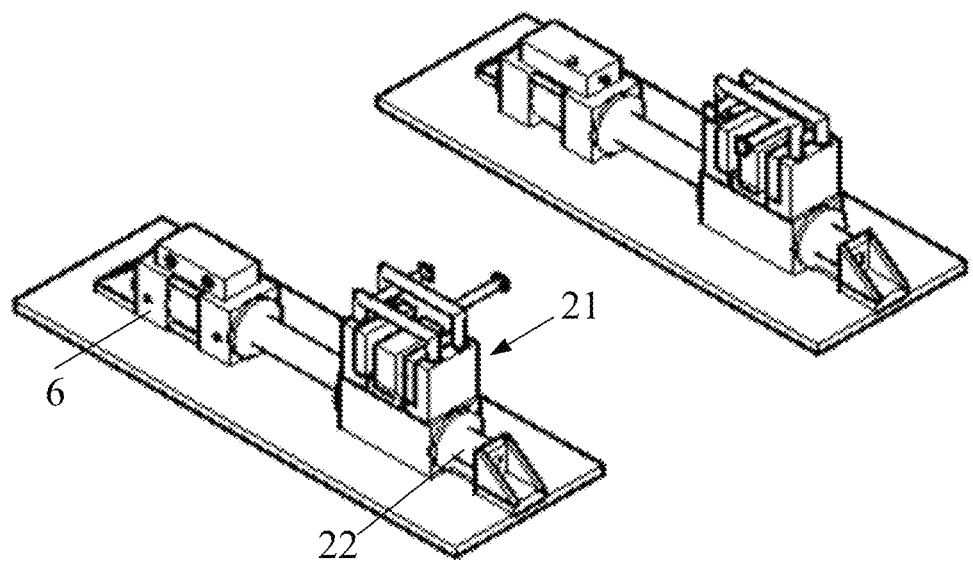
FIG. 3 is a schematic diagram of two reciprocating water pump sets.
Figure 4:
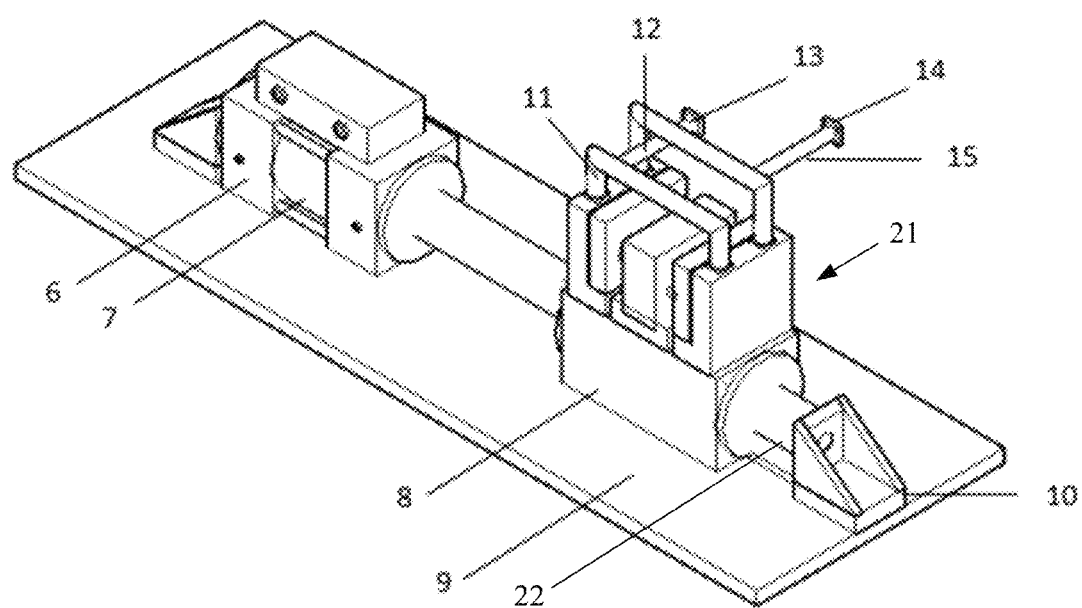
FIG. 4 is a schematic structural diagram of the reciprocating water pump set.
Figure 5:
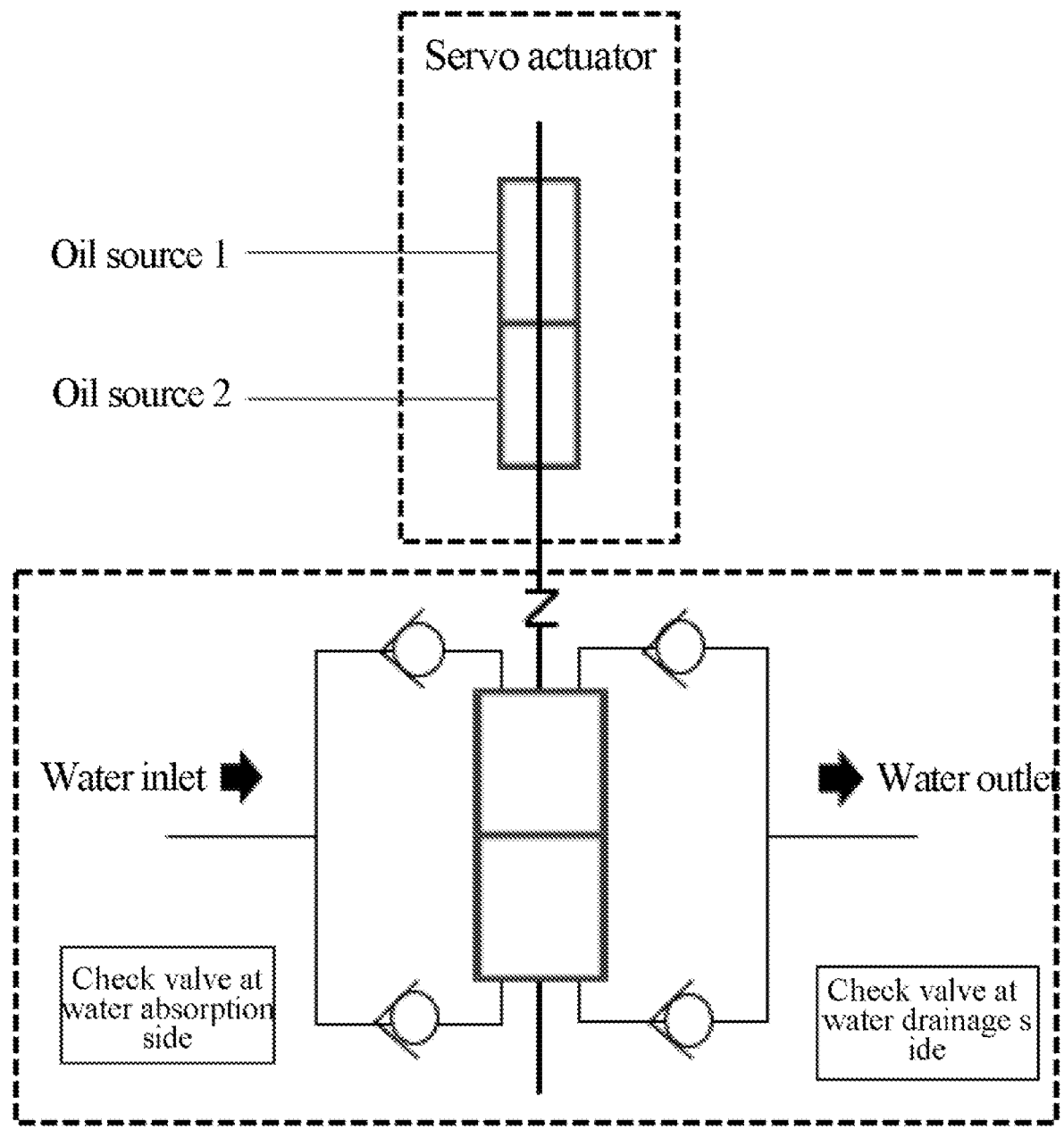
FIG. 5 is the working principle diagram of the reciprocating water pump set.

As shown in FIGS. 3-5, the control of the servo actuator 6 is realized by controlling the oil distributor 3, so that water can be absorbed and drained at a certain speed and stroke. Water enters the model box from the water inlet 13 and the water inlet 12, and is driven by the pressure of the hydraulic cylinder 7 to pass through the check valve 11 and then discharged via the water outlet 15 and the water outlet 14, thus completing accurate water supply.

As shown in FIGS. 1-5 and 9, an apparatus for accurate flow control in a centrifugal supergravity environment provided by an embodiment of the present application includes a control center, an oil supply module, a sensor module, an execution module and a centrifugal machine; wherein the control center and the oil supply module are deployed in a normal gravity environment, and the sensor module and the execution module are deployed in a supergravity environment.

The oil supply module includes an oil source 5, an oil distributor 3 and an oil distributor servo valve; the oil source 5 is connected with the oil distributor 3 by an oil supply pipeline; the oil distributor 3 is installed at a proximal end 4 of a rotary arm of the centrifugal machine, and the other end of the oil distributor 3 is connected with a servo actuator 6 by an oil supply pipeline for supplying oil to the servo actuator 6; the oil distributor servo valve is installed on the oil distributor 3 and used for controlling an output flow of the oil distributor 3.

The execution module includes a base 9, and two reciprocating water pump sets, support components 10 and a model box fixed on the base 9; each reciprocating water pump set consists of the servo actuator 6 and a reciprocating water pump 21 connected in series; the base 9 is fixed on a bottom plate of a centrifugal machine basket 1 by screws; the servo actuator 6 is used for controlling the work of the reciprocating water pump; the reciprocating water pump is provided with a matched water distribution valve block 8 and is communicated with the model box by a water inlet pipe 12 and a water outlet pipe; the support components 10 are respectively positioned at ends of the reciprocating water pump and the servo actuator 6 to fix the reciprocating water pump and the servo actuator 6, and provide support for a cantilever structure 22 of the reciprocating water pump 21, so as to avoid the cantilever structure 22 from being forced to bend under the supergravity environment. The support component 10 includes a first plate fixed to the base 9 and a second plate fixed to an end of the cantilever structure 22 or the servo actuator 6. The first plate and the second plate are perpendicular to each other and are connected by two triangular plates. A base of the model box is fixed in the center of the bottom plate of the centrifugal machine basket 1 by screws, and the two reciprocating water pump sets are symmetrically arranged on two sides of the model box, so that the self-weight of the apparatus is evenly distributed on the bottom plate of the centrifugal machine basket; an internal structure of the model box comprises an upper water storage tank 17, a model area, a lower water storage tank 19, a model box water inlet 16 and a model box water outlet 20, and the reciprocating water pump is connected with the model box water inlet 16 by a water inlet pipe 12 and the model box water outlet 20 by a water outlet pipe 15.

The sensor module includes a liquid level sensor, a displacement sensor and a flow sensor, which are respectively configured for collecting liquid level information of the model box, piston position information of the servo actuator 6 and water supply flow information of the model box; the liquid level sensor is arranged in the upper water storage tank of the model box and measures and feeds back a liquid level height; the displacement sensor is installed on a piston rod of the servo actuator 6 and measures and feeds back a piston position of the servo actuator 6; the flow sensor is installed on a water inlet pipeline of the model box and measures and feeds back a water supply flow of the model box; the liquid level sensor, the displacement sensor and the flow sensor are all used in the supergravity environment, and are all connected with a remote controller to feed back signals to the remote controller.

The control center includes a servo controller, the remote controller and a servo actuator control unit, and is used for processing data of all sensors, controlling the servo actuator 6 by controlling the oil distributor 3, and then controlling the reciprocating water pump by the servo actuator 6 to control the water supply flow, thereby achieving a goal of accurate liquid level control.

The servo controller is installed at the proximal end 4 of the rotary arm of the centrifugal machine and connected with the oil distributor servo valve, controls the oil distributor servo valve according to flow and liquid level requirements, and achieves control of the servo actuator 6 by controlling the oil distributor 3 by the oil distributor servo valve, so as to control the reciprocating water pump to complete water absorption or drainage at a certain speed and stroke.

The remote controller is installed on an instrument bin 2 of the centrifugal machine, connected with the servo controller for controlling the servo actuator 6, and connected with the sensor to collect sensor information and feed the sensor information back to the servo actuator control unit.

The servo actuator control unit is installed at a user terminal outside the centrifugal machine, and is configured for generating control signals, forwarding the control signals to the servo controller by the remote controller, and outputting the control signals to the servo actuator 6 to complete a closed-loop control of water supply flow and liquid level.

An embodiment of the present application further provides a method for accurate flow control in a centrifugal supergravity environment. According to the method, flow fluctuation of the reciprocating water pump is weakened by active complementation of flows of dual pump sets. The method includes the following steps:

In step 1 of setting initialization parameters and basic parameters: the control modes are set as speed control and closed-loop control; the response of a control signal output is as follows: a flow control accuracy of 0.05 L/s corresponds to the piston speed of the servo actuator of 10 mm/s or 600 mm/min.

In step 2 of equipment transfer and installation: the sensor module and the execution module are installed on the centrifugal machine, and whether the oil supply module leaks oil and a power supply state of a power supply system of the centrifugal machine are checked.

In step 3 of checking before starting: the motion state of the servo actuator and working states of the flow sensor, the liquid level sensor and the displacement sensor under normal gravity are checked, and the sensors are debugged until the states are stable.

In step 4 of no-load operation: the following contents are tested under conditions of centrifugal accelerations of 1 g, 10 g, 30 g, 60 g, 100 g and 150 g and oil source pressures of 3.5 MPa, 7.2 MPa, 13.5 MPa and 20.9 MPa, respectively: sensor working state test: working states of the flow sensor, the liquid level sensor and the displacement sensor under supergravity; servo actuator performance test: low-speed crawling performance parameters of a hydraulic cylinder and low-speed closed-loop control performance parameters under different g values.

In step 5 of accurate flow control of the execution module: two reciprocating water pumps are named as a target water pump and a control water pump respectively, and the flows of the two reciprocating water pumps are abruptly changed into a controllable flow fluctuation $\Delta Q$ in a time $\Delta t$ by precisely controlling a displacement of the servo actuator, with a flow fluctuation phase difference of 180°; inputting control signals as shown in formulas (1) and (2) in the servo actuator control unit to control the oil distributor servo valve, so as to control the water supply flow of the reciprocating water pumps; the flow of the target water pump is $Q_1$, the flow rate of the control water pump is $Q_2$, T is a cycle of water supply, $\Delta t$ is the time of abrupt change of the flows, $Q_0$ is a final flow that is stably output, $\Delta Q$ is a flow fluctuation caused by pulsation, and t indicates a certain moment.

$$Q_1 = \begin{cases} \dfrac{2\Delta Q}{\Delta t} \times t + \dfrac{Q_0}{2} - \Delta Q & t \in \left[0, \dfrac{\Delta t}{2}\right) \\ \dfrac{Q_0}{2} & t \in \left[\dfrac{\Delta t}{2}, \dfrac{T}{2} - \dfrac{\Delta t}{2}\right) \\ -\dfrac{2\Delta Q}{\Delta t} \times t + \dfrac{Q_0}{2} - \Delta Q + \dfrac{\Delta Q}{\Delta t} \times T & t \in \left[\dfrac{T}{2} - \dfrac{\Delta t}{2}, \dfrac{T}{2}\right] \end{cases} \quad (1)$$

$$Q_2 = \begin{cases} \dfrac{Q_0}{2} & t \in \left[0, \dfrac{T}{4} - \dfrac{\Delta t}{2}\right) \\ -\dfrac{2\Delta Q}{\Delta t} \times t + \dfrac{Q_0}{2} - \Delta Q + \dfrac{\Delta Q}{2\Delta t} \times T & t \in \left[\dfrac{T}{4} - \dfrac{\Delta t}{2}, \dfrac{T}{4}\right) \\ \dfrac{2\Delta Q}{\Delta t} \times t + \dfrac{Q_0}{2} - \Delta Q - \dfrac{\Delta Q}{2\Delta t} \times T & t \in \left[\dfrac{T}{4}, \dfrac{T}{4} + \dfrac{\Delta t}{2}\right) \\ \dfrac{Q_0}{2} & t \in \left[\dfrac{T}{4} + \dfrac{\Delta t}{2}, \dfrac{T}{2}\right] \end{cases} \quad (2)$$

In step 6, the two reciprocating water pumps are actively controlled to generate equal and reverse flow fluctuations; the phase difference of the reverse flow fluctuations is 180° and 90° from the phase difference of the flow fluctuations in step 5; as shown in equations (3) and (4), the flows of the target water pump and the control water pump after the equal and reverse flow fluctuations are as follows:

$$= \begin{cases} \dfrac{2\Delta Q}{\Delta t} \times t + \dfrac{Q_0}{2} - \Delta Q & t \in \left[0, \dfrac{\Delta t}{2}\right) \\ \dfrac{Q_0}{2} & t \in \left[\dfrac{\Delta t}{2}, \dfrac{T}{4} - \dfrac{\Delta t}{2}\right) \\ \dfrac{2\Delta Q}{\Delta t} \times t + \dfrac{Q_0}{2} + \Delta Q - \dfrac{\Delta Q}{2\Delta t} \times T & t \in \left[\dfrac{T}{4} - \dfrac{\Delta t}{2}, \dfrac{T}{4}\right) \\ -\dfrac{2\Delta Q}{\Delta t} \times t + \dfrac{Q_0}{2} + \Delta Q + \dfrac{\Delta Q}{2\Delta t} \times T & t \in \left[\dfrac{T}{4}, \dfrac{T}{4} + \dfrac{\Delta t}{2}\right) \\ \dfrac{Q_0}{2} & t \in \left[\dfrac{T}{4} + \dfrac{\Delta t}{2}, \dfrac{T}{2} - \dfrac{\Delta t}{2}\right) \\ -\dfrac{2\Delta Q}{\Delta t} \times t + \dfrac{Q_0}{2} - \Delta Q + \dfrac{\Delta Q}{\Delta t} \times T & t \in \left[\dfrac{T}{2} - \dfrac{\Delta t}{2}, \dfrac{T}{2}\right] \end{cases} \quad (3)$$

$$Q_2 = \begin{cases} -\dfrac{2\Delta Q}{\Delta t} \times t + \dfrac{Q_0}{2} + \Delta Q & t \in \left[0, \dfrac{\Delta t}{2}\right) \\ \dfrac{Q_0}{2} & t \in \left[\dfrac{\Delta t}{2}, \dfrac{T}{4} - \dfrac{\Delta t}{2}\right) \\ -\dfrac{2\Delta Q}{\Delta t} \times t + \dfrac{Q_0}{2} - \Delta Q + \dfrac{\Delta Q}{2\Delta t} \times T & t \in \left[\dfrac{T}{4} - \dfrac{\Delta t}{2}, \dfrac{T}{4}\right) \\ \dfrac{2\Delta Q}{\Delta t} \times t + \dfrac{Q_0}{2} - \Delta Q - \dfrac{\Delta Q}{2\Delta t} \times T & t \in \left[\dfrac{T}{4}, \dfrac{T}{4} + \dfrac{\Delta t}{2}\right) \\ \dfrac{Q_0}{2} & t \in \left[\dfrac{T}{4} + \dfrac{\Delta t}{2}, \dfrac{T}{2} - \dfrac{\Delta t}{2}\right) \\ \dfrac{2\Delta Q}{\Delta t} \times t + \dfrac{Q_0}{2} + \Delta Q - \dfrac{\Delta Q}{\Delta t} \times T & t \in \left[\dfrac{T}{2} - \dfrac{\Delta t}{2}, \dfrac{T}{2}\right] \end{cases} \quad (4)$$

In step 7, the control water pump is allowed to actively delay by a phase difference of 90°, and the water supply flows of the control water pump and the target water pump are combined and output to obtain the final flow $Q_0$ that is stably output; complementing a negative flow fluctuation, generated when a motion direction of the reciprocating water pump is changed, with a positive flow fluctuation that is actively controlled, and finally a stable water supply flow is output, thus ensuring the feasibility of accurate flow control;

In step 8 of test of the whole water supply performance of the reciprocate pump sets: testing water supply flow, water supply efficiency, and continuous operations under the control of different amplitude-frequency parameters;

In step 9, running is stopped and the machine is disassembled, and processing data are analyzed.

Figure 6:
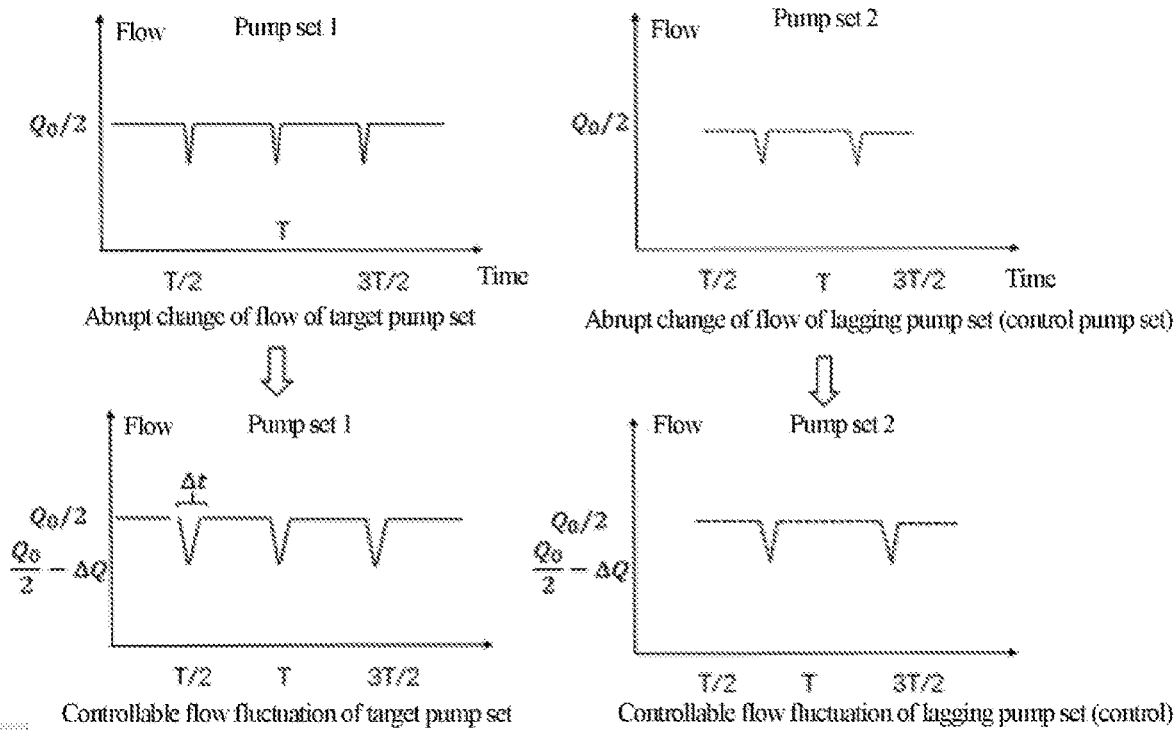
FIG. 6 is a schematic diagram of flow fluctuation in active flow control of dual pump sets.
Figure 7:
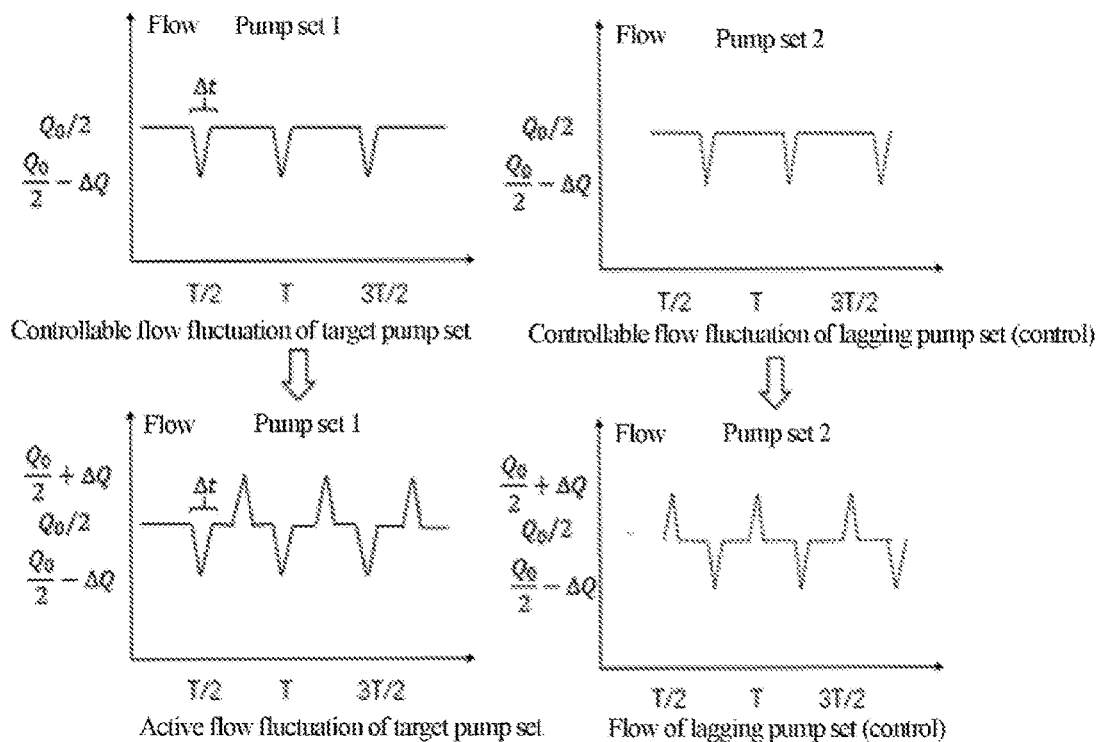
FIG. 7 is a schematic diagram of generating equal and reverse flows by double pump sets.
Figure 8:
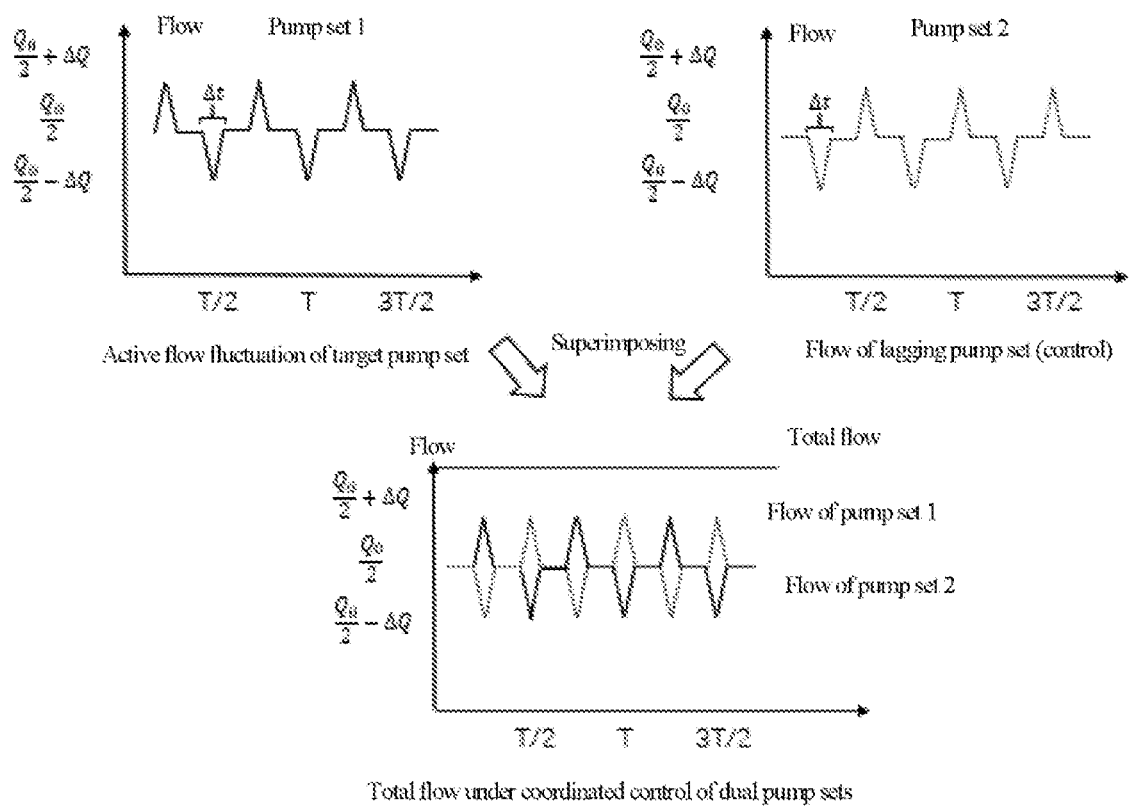
FIG. 8 is a schematic diagram of weakening the flow fluctuation of the reciprocating water pumps by active flow complementation of dual pump sets.
Figure 9:
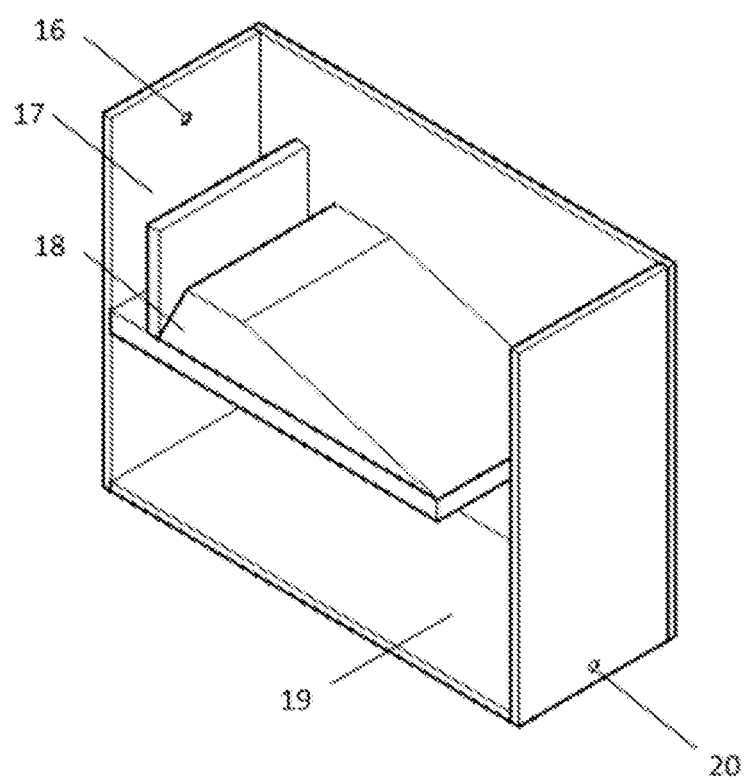
FIG. 9 is a schematic structural view of the model box.

FIG. 6 is a schematic diagram of flow fluctuation in active flow control of dual pump sets; FIG. 7 is a schematic diagram of generating equal and reverse flows by double pump sets; FIG. 8 is a schematic diagram of weakening the flow fluctuation of the reciprocating water pumps by active flow complementation of dual pump sets. According to the present application, the flow fluctuation of the reciprocating water pump is weakened by the active complementation of flows of dual pump sets, so that accurate flow control can be realized.

In one embodiment, the flow sensor the flow sensor is a customized electromagnetic flowmeter with a measuring range of 1.3 L/s and a resolution of 0.005 L/s. The displacement sensor is a customized LVDT displacement sensor with a measuring range of ±75 mm and a resolution of 0.005 mm. The liquid level sensor is a floating ball level gauge measuring sensor with a measuring range of ±250 mm. The water inlet pipes of the two reciprocating water pumps are communicated with the water inlet of the model box by a tee joint, and the water outlet pipes of the two reciprocating water pumps are communicated with the water outlet of the model box by a tee joint. The centrifugal machine has an acceleration range of 1 g-150 g, a maximum load of 4 t, and a centrifugal machine capacity of 400 g·t. The oil distributor has an output quantity of 4, a rated working pressure of 21 MPa, and a control voltage of DC24V. The servo actuator has a stroke of 200 mm. The upper water storage tank of the model box has a volume of 0.02 m³, and the lower water storage tank of the model box has a volume of 0.32 m³.

The above embodiments are only preferred embodiments of the present application, and they are not intended to limit the present application. The present application may have various modifications and variations for those skilled in the art. Any modification, equivalent substitution, improvement and the like made within the spirit and principle of the present application shall be included in the protection scope of the present application.

What is claimed is:

1. An apparatus for accurate flow control in a centrifugal supergravity environment, comprising a control center, an oil supply module, a sensor module, an execution module and a centrifugal machine; wherein the control center and the oil supply module are deployed in a normal gravity environment, and the sensor module and the execution module are deployed in a supergravity environment;

wherein the oil supply module comprises an oil source, an oil distributor and an oil distributor servo valve, the oil source is connected to the oil distributor via an oil supply pipeline, and is further connected to a servo actuator via another oil supply pipeline for supplying oil to the servo actuator, the oil distributor is provided at a proximal end of a rotary arm of the centrifugal machine, and the oil distributor, and the oil distributor servo valve is provided on the oil distributor and is configured to control an output flow of the oil distributor;

wherein the execution module comprises a base, and two reciprocating water pump sets, support components and a model box, the two reciprocating water pump sets and the support components are fixed on the base, each reciprocating water pump set comprises the servo actuator and a reciprocating water pump connected in series, the base of the execution module is fixed on a bottom plate of a centrifugal machine basket by a screw, the servo actuator is configured to control operation of the reciprocating water pump, the reciprocating water pump is provided with a matched water distribution valve block and is communicated with the model box by a water inlet pipe and a water outlet pipe, the support components are respectively provided at an end of the reciprocating water pump and an end of the servo actuator, to fix the reciprocating water pump and the servo actuator, and provide support for a cantilever structure of the reciprocating water pump, so as to avoid the cantilever structure from being forced to bend under the supergravity environment, a base of the model box is fixed in the center of the bottom plate of the centrifugal machine basket by another screw, and the two reciprocating water pump sets are symmetrically arranged on two sides of the model box, in such a manner that the self-weight of the apparatus is evenly distributed on the bottom plate of the centrifugal machine basket, an internal structure of the model box comprises an upper water storage tank, a model area, a lower water storage tank, a water inlet and a water outlet, and the reciprocating water pump is connected to the water inlet of the model box by the water inlet pipe, and is connected to the water outlet of the model box by the water outlet pipe;

wherein the sensor module comprises a liquid level sensor, a displacement sensor and a flow sensor, wherein the liquid level sensor is configured to collect liquid level information of the model box, the displacement sensor is configured to collect piston position information of the servo actuator, and the flow sensor is configured to collect information of a water supply flow of the model box, the liquid level sensor is provided in an upper water storage tank of the model box, and is configured to measure and feed-back a liquid level height, the displacement sensor is provided on a piston rod of the servo actuator, and is configured to measure and feed-back the piston position information of the servo actuator, the flow sensor is provided on the water inlet pipe of the model box and measures, and is configured to feed-back information of the water supply flow of the model box, and the liquid level sensor, the displacement sensor and the flow sensor are all used in the supergravity environment, and are all connected to a remote controller to feed-back signals to the remote controller;

wherein the control center comprises a servo controller, the remote controller and a servo actuator control unit, and is configured to process data of the liquid level sensor, the displacement sensor and the flow sensor, controlling the servo actuator by controlling the oil distributor, and control the reciprocating water pump by the servo actuator to control the water supply flow, so as to achieve a goal of accurate liquid level control;

wherein the servo controller is provided at the proximal end of the rotary arm of the centrifugal machine, and is connected to the oil distributor servo valve, controls the oil distributor servo valve according to flow and liquid level requirements, and achieves control of the servo actuator by controlling the oil distributor by the oil distributor servo valve, so as to control the reciprocating water pump to complete water absorption or drainage at a certain speed and stroke;

wherein the remote controller is provided on an instrument bin of the centrifugal machine, is connected to the servo controller for controlling the servo actuator, and is connected to the sensor module for collecting sensor information and feeding the sensor information back to the servo actuator control unit; and wherein the servo actuator control unit is provided at a user terminal outside the centrifugal machine, and is configured to generate control signals, forward the control signals to the servo controller by the remote controller, and output the control signals to the servo actuator to complete a closed-loop control of water supply flow and liquid level.

2. The apparatus for accurate flow control in a centrifugal supergravity environment according to claim 1, wherein the flow sensor is a customized electromagnetic flowmeter with a measuring range of 1.3 L/s and a resolution of 0.005 L/s.

3. The apparatus for accurate flow control in a centrifugal supergravity environment according to claim 1, wherein the displacement sensor is a customized LVDT displacement sensor, with a measuring range of ±75 mm and a resolution of 0.005 mm.

4. The apparatus for accurate flow control in a centrifugal supergravity environment according to claim 1, wherein the liquid level sensor is a floating ball level gauge measuring sensor, with a measuring range of ±250 mm.

5. The apparatus for accurate flow control in a centrifugal supergravity environment according to claim 1, wherein the water inlet pipes of the two reciprocating water pumps are communicated with the water inlet of the model box by a tee joint, and the water outlet pipes of the two reciprocating water pumps are communicated with the water outlet of the model box by another tee joint.

6. The apparatus for accurate flow control in a centrifugal supergravity environment according to claim 1, wherein the centrifugal machine has an acceleration range of 1 g-150 g, a maximum load of 4 t, and a centrifugal machine capacity of 400 g·t.

7. The apparatus for accurate flow control in a centrifugal supergravity environment according to claim 1, wherein the oil distributor has 4 outputs, a rated working pressure of 21 MPa, and a control voltage of DC24V.

8. The apparatus for accurate flow control in a centrifugal supergravity environment according to claim 1, wherein the servo actuator has a stroke of 200 mm.

9. The apparatus for accurate flow control in a centrifugal supergravity environment according to claim 1, wherein the upper water storage tank of the model box has a volume of 0.02 $m^3$, and the lower water storage tank of the model box has a volume of 0.32 $m^3$.

* * * * *